United States Patent [19]

Iwata

[11] Patent Number: 4,908,779

[45] Date of Patent: Mar. 13, 1990

[54] DISPLAY PATTERN PROCESSING APPARATUS

[75] Inventor: Tsukasa Iwata, Tokyo, Japan

[73] Assignee: NEC Corporation, Tokyo, Japan

[21] Appl. No.: 847,343

[22] Filed: Apr. 2, 1986

[30] Foreign Application Priority Data

Apr. 2, 1985 [JP] Japan .................................. 60-69301

[51] Int. Cl.[4] ............................................... G06F 3/153

[52] U.S. Cl. .................................... 364/518; 364/521; 340/703; 340/799

[58] Field of Search ... 364/521, 518, 522, 900 MS File; 340/703, 799

[56] References Cited

U.S. PATENT DOCUMENTS

| | | | |
|---|---|---|---|
| 3,389,404 | 6/1968 | Koster | 364/900 |
| 4,016,544 | 4/1977 | Morita et al. | 340/703 X |
| 4,490,797 | 12/1984 | Staggs et al. | 340/721 X |
| 4,528,636 | 7/1985 | Robinson, III | 364/521 |
| 4,595,917 | 6/1986 | McCallister et al. | 364/521 |
| 4,635,048 | 1/1987 | Nishi et al. | 340/799 |
| 4,641,282 | 2/1987 | Ounuma | 340/703 |
| 4,677,427 | 6/1987 | Komatsu et al. | 340/703 |
| 4,689,613 | 8/1987 | Ikeda | 340/703 |

OTHER PUBLICATIONS

Prokop, IBM Technical Disclosure Bulletin, vol. 20, No. 4, Sep. 1977, pp. 1290–1291.

*Primary Examiner*—Gary V. Markcom
*Assistant Examiner*—Mark K. Zimmerman
*Attorney, Agent, or Firm*—Sughrue, Mion, Zinn, Macpeak & Seas

[57] ABSTRACT

A display pattern processing apparatus is responsive to pattern data and color codes input by an operator. A program memory stores program for execution, appropriate programs being selected for execution depending on the input pattern data. Simple color reproduction with a single foreground color and a single background color is possible, as is multicolor reproduction with multiple foreground colors and a single background color. The number and nature of the programs stored depends on whether simple or multicolor reproduction is desired.

6 Claims, 4 Drawing Sheets

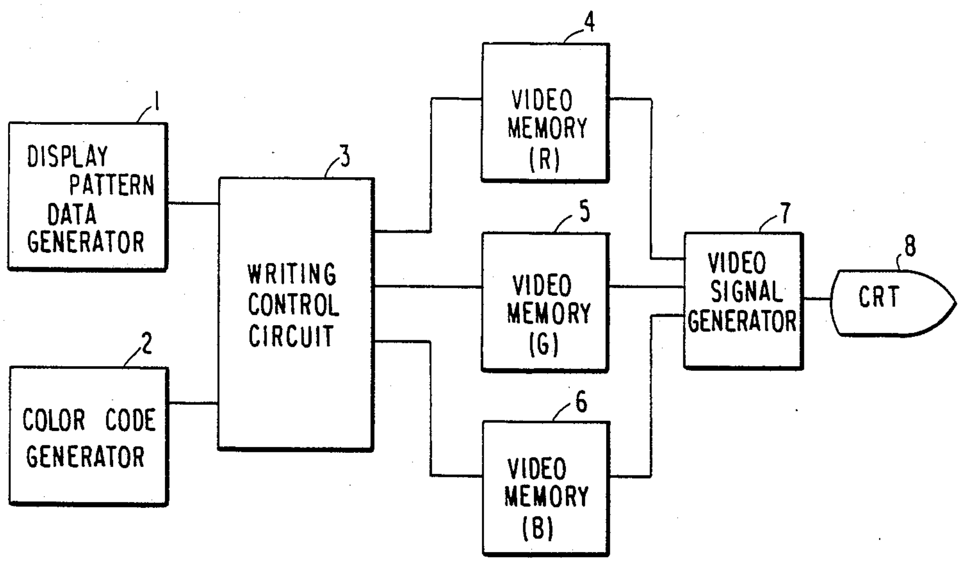
FIG. 1 PRIOR ART
FIG. 2 PRIOR ART
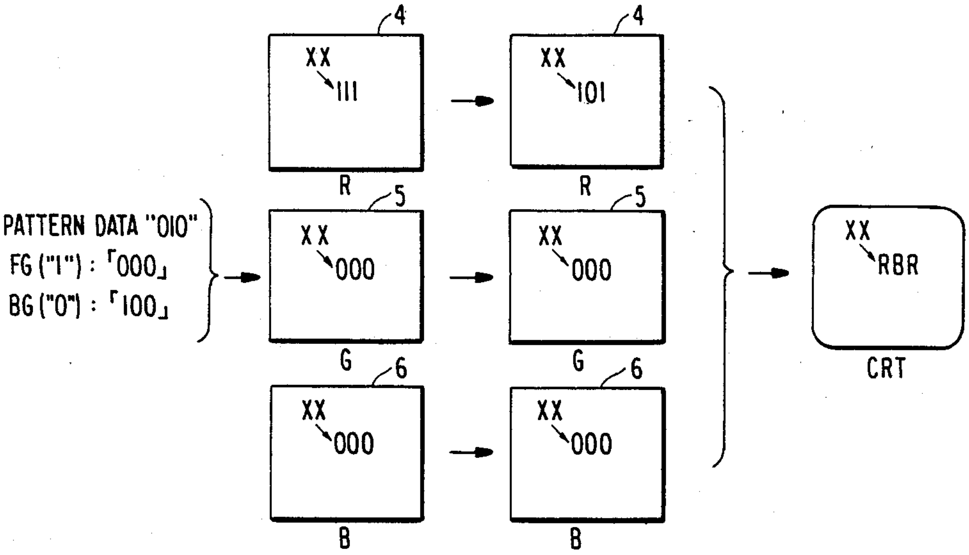

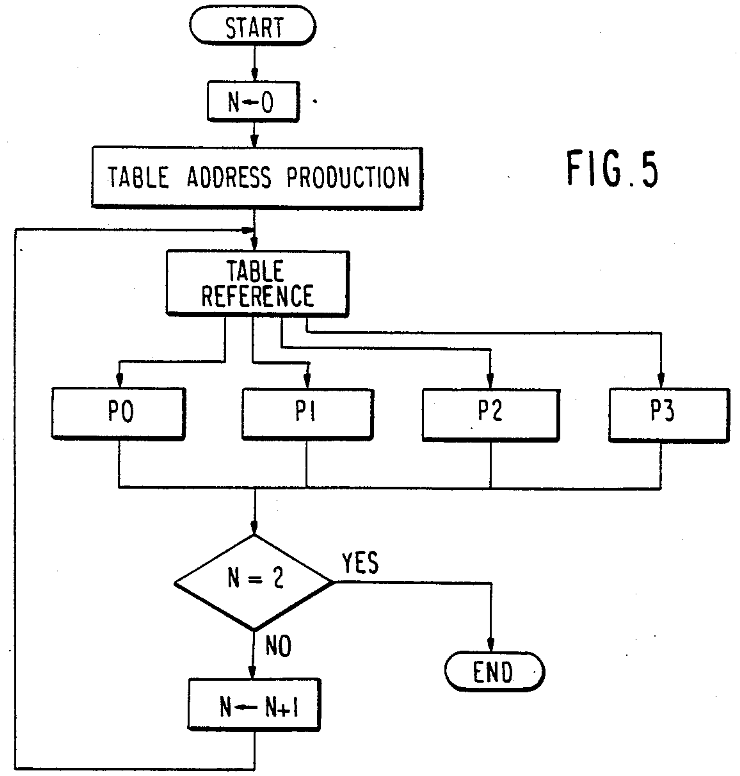
FIG.5
FIG.6
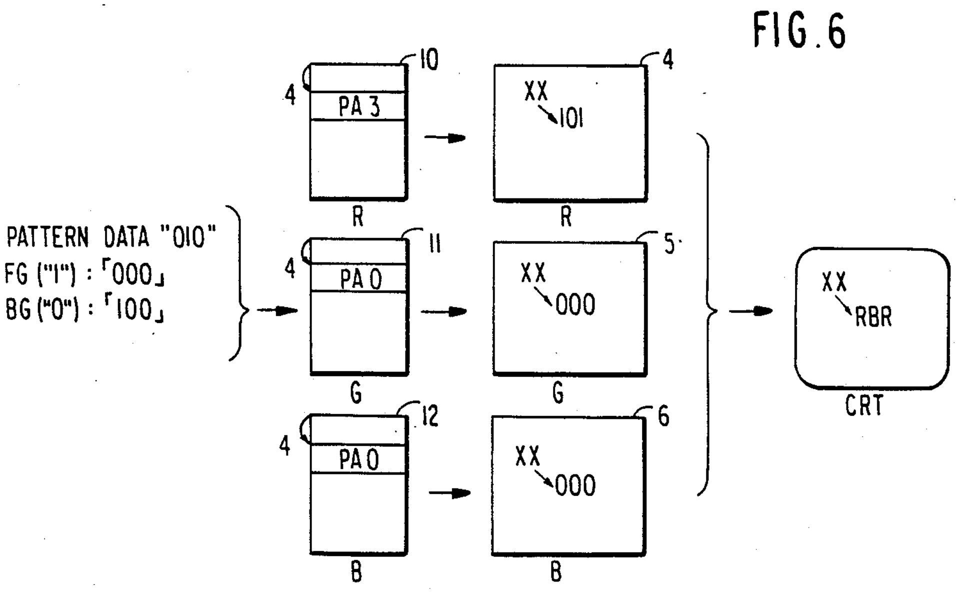

DISPLAY PATTERN PROCESSING APPARATUS

BACKGROUND OF THE INVENTION

1. Field of the Invention

The present invention relates to a display pattern processing apparatus, and more particularly to a color pattern processing apparatus having a video memory into which is written color pattern data which is to be displayed on a display such as a cathode ray tube (CRT).

2. Description of the Background Art

Color data to be displayed on a CRT generally is written first into a video memory which is a random access memory (RAM) in accordance with a pre-edit operation. Thereafter, the color data is converted into a video signal and is sent to the CRT. The number of bits which may be stored in the video memory usually is at least as large as the number of picture elements on a CRT screen. In a color display, three video memories are required, for red (R), green (G), and blue (B), respectively. Color data corresponding to one picture element, then, consists of three bits, one red, one green, and one blue. A color to be displayed is determined in accordance with a combination of these bits.

Thus, eight colors, as indicated in Table 1 on the next page, may be displayed according to the combination of the red, green, and blue bits.

TABLE 1

| R | G | B | Color |
|---|---|---|---|
| 1 | 0 | 0 | Red |
| 0 | 1 | 0 | Green |
| 0 | 0 | 1 | Blue |
| 0 | 0 | 0 | Black |
| 1 | 0 | 1 | Magenta |
| 1 | 1 | 0 | Yellow |
| 0 | 1 | 1 | Cyan |
| 1 | 1 | 1 | White |

Display pattern data and a color code are required for a color display. The color code consists of three bits (R, G, B) as described above, and is assigned to each item of pattern data. The color code is designated by an operator and is written into the video memories.

In multicolor displays, it has been known to execute a writing operation to the video memories for each of the colors to be displayed. For example, when two colors (such as red and black) are to be displayed, a color code for one of the two colors first is written into all of the video memories. Thereafter, the other color code is written. That is, a red color code "1 0 0" first is written into all locations in the video memories. Then, every location where a black color code "0 0 0" is to be written is changed to the black color code. Therefore, at least two writing operations must be performed for a two-color display. If more than two colors are to be displayed, one writing operation must be performed for each color to be displayed. These writing operations require much time.

Further, digital pattern processing, such as filing for changing luminance, or masking has been proposed. To perform digital pattern processing, a logical operation (AND, OR, EXOR, and the like) is required. It has been known to perform such a logical operation after writing the appropriate color codes into the video memories. Therefore, reading of the color data written into the video memories, a logical operation according to the desired digital pattern processing, and a writing operation of the result of the logical operation into the video memories also are required.

SUMMARY OF THE INVENTION

In view of the foregoing, it is an object of the present invention to provide a pattern processing apparatus capable of high-speed processing of color data.

Another object of the invention is to provide a pattern processing apparatus capable of writing color data into a video memory quickly.

Yet another object of the present invention is to provide a display pattern processing apparatus suitable for producing a multicolor display.

In accordance with these and other objects, a display pattern processing apparatus of the present invention comprises means for producing display pattern data, means for generating a plurality of color codes, a memory for storing a plurality of programs, means for reading a selected one of the programs out of the memory in accordance with the color codes, means for producing color data according to the program which has been read out, and means for writing the color data into a video memory. The reading means assigns one of the programs for a red video memory, a green video memory, and a blue video memory, respectively, according to the plurality of color codes. These color codes are combined according to a predetermined order and are used as an address.

According to the present invention, color data to be displayed are produced in a single program execution. Therefore, color data can be written into a video memory in a single writing operation, and changing of contents of the video memories is required. Thus, color display control is simplified, and high speed color display can be obtained. Further, a color display program is selected on the basis of the color codes for the color display. In other words, the combination of the color codes is used as an address for designating a program. Therefore, selection of a program is easy and may be performed at high speed.

According to the present invention, $2^n$ programs are employed when n colors are displayed, as described hereinafter. If digital pattern processing, such as filing or masking, is employed, the programs may be modified, or another program may be added as desired. In such a case, a digital code designating the required digital pattern processing would be required. A program to be executed is selected according to the combination of the color codes with the digital code.

BRIEF DESCRIPTION OF THE DRAWINGS

The present invention now will be described in accordance with the accompanying drawings, wherein:

FIG. 1 shows a block diagram of a conventional pattern processing apparatus:

FIG. 2 represents a conventional writing operation into video memories;

FIG. 5 shows a flow chart for a color data writing operation according to the present invention; and FIG. 6 represents a writing operation into video memories in accordance with the present invention.

DETAILED DESCRIPTION OF A PREFERRED EMBODIMENT

Figure 3:
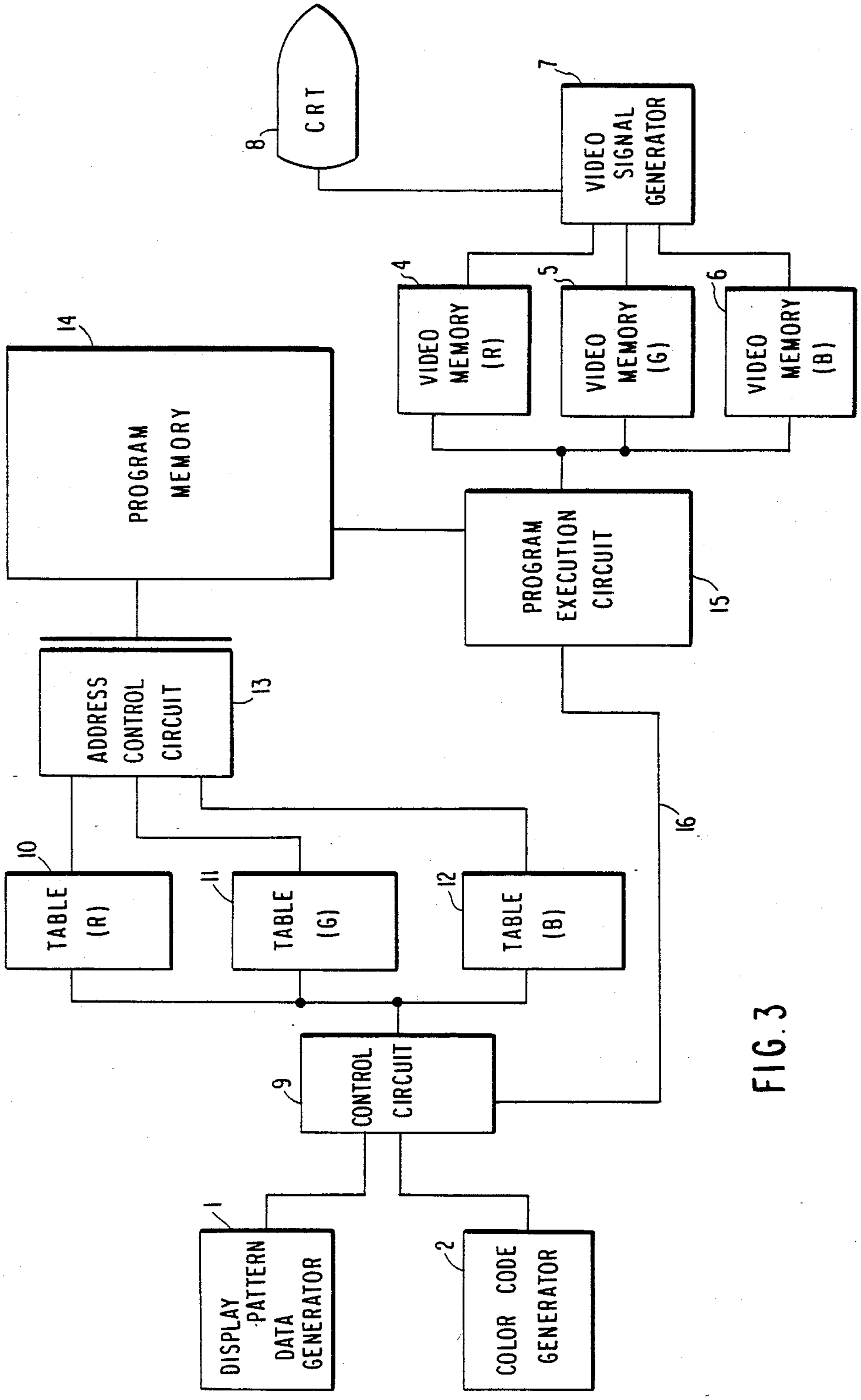
FIG. 3 shows a block diagram of a display pattern processing apparatus according to one embodiment of the present invention.

As has been known, and as shown in FIG. 1, pattern data generated by a pattern generator 1 and a color code generated by a color code generator 2 are applied to a writing control circuit 3. When multicolor display is required, a plurality of color codes are generated by the color code generator 2. The writing control circuit 3 produces red, green, and blue color data, and writes them into video memories 4 (R), 5 (G), and 6 (B), respectively. The color data in the video memories are converted into a color video signal by a video signal generator 7 and are transferred to a display unit 8, such as a CRT. Here, each video memory can store at least as many bits as there are picture elements (dots) on a CRT screen.

A conventional video memory writing operation now will be explained with reference to FIG. 2 for the operation steps, and to FIG. 1 for structural elements. Let it now be assumed that a pattern "0 1 0" is displayed at arbitrary address locations XX, XX+1, XX+2 on a CRT screen. When a red color is displayed in locations XX and XX+2 corresponding to the pattern data "0" and a black color is displayed in the location XX+1 corresponding to the pattern "1", a red color code "1 0 0" and a black color code "0 0 0" are generated by the color code generator 2. In this case, red is displayed on a background represented by the pattern data "0", while black is displayed on a foreground represented by the pattern data "1". That is, red (R) - black (B) - red (R) are sequentially displayed on the screen.

As has been known, a "1" is written at all address locations XX, XX+1' and XX+2 of the video memory 4 (R), and a "0" is written at all address locations XX, XX+1, and XX+2 of the video memories 5 (G) and 6 (B), respectively. With this condition, red is displayed at all locations XX, XX+1, and XX+2 on the screen. Thereafter, a second writing operation is required to change red color data at the location XX'1 to black color data. According to the second writing operation, a "0" is written at the address location XX+1 of the video memories 4, 5, and 6, respectively. Thus, red is displayed in the background, while black is displayed in the foreground.

As described above, three writing operations are required to display red, and at least one additional writing operation is required thereafter to display black, consuming a great deal of time as a result.

One embodiment of the present invention is shown in FIG. 3. In FIG. 3, pattern data and a color code generated by display pattern data generator 1 and color code generator 2, respectively, are entered into a control circuit 9 by means of an operator console (e.q. keyboard, disk or the like) or under program control. The control circuit 9 produces an address for designating tables 10, 11, and 12 according to the color code. As described above, a plurality of color codes are entered into the control circuit 9 for multicolor display.

In this embodiment, three tables are prepared. The table 10 is used to select a program by which color data to be written into the video memory 4 (R) is produced. The other tables 11 and 12 are used to select programs for producing color data to be written into the video memories 5 (G) and 6 (B), respectively. These tables are preliminarily prepared in a table memory (not shown), such as a read-only memory (ROM), a RAM, or the like. An output of each table is sent to an address control circuit 13 to select one of a plurality of programs stored in a program memory 14. The selected program is applied to a program execution circuit 15. The program execution circuit 15 produces color data by using the pattern data transferred through a bus 16 according to the selected program. The color data is written into one of the respective video memories 4, 5, and 6.

Figure 4:
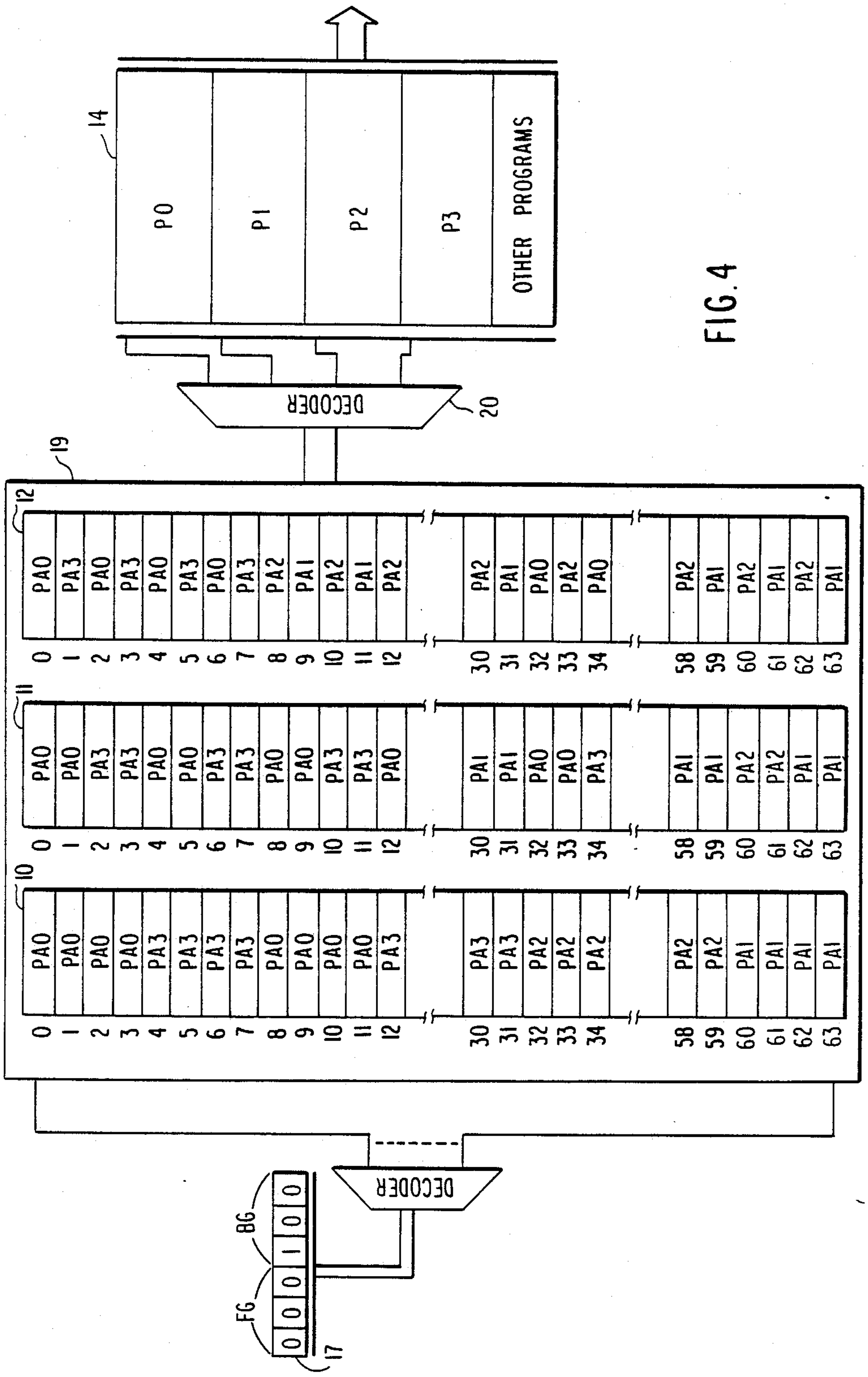
FIG. 4 shows a detailed block diagram of a table memory and a program memory shown in FIG. 3.

Referring to FIG. 4, the tables and the program memory now will be described in detail. Here, tables and programs to display two colors (red and black) have been prepared as an example. The background (BG) is red, while the foreground (FG) is black. Since two colors are displayed, at least four programs PO to P3 are prepared. Start addresses of these four programs PO to P3 are PAO, PA1, PA2, and PA3, respectively. A table memory 19 contains three tables 10, 11, and 12, each of which stores 64 start addresses in a predetermined order.

When the pattern data "0" is red and "1" is black as in FIG. 6 which describes a writing operation, FIGS. 3 and 4 showing corresponding structural elements, the red color code "1 0 0" and the black color code "0 0 0" are entered into the control circuit 9. The control circuit 9 has a register 17. The red code "1 0 0" of the background is stored in a lower portion of the register 17, and the black code "0 0 0" of the foreground is stored in an upper portion of the register 17, as shown in FIG. 4. Thus, the black and red codes are combined and are used as an address for accessing the table memory 19.

The content of the register, which is used as an address for accessing the table memory 19, is decoded by a decoder 18 and is applied to the table memory 19. In this case, the address "0 0 0 1 0 0" represents "4", so that the address "4" of the table memory 19 is designated. Thus, the start addresses PA3, PAO, and PAO are read out of the tables 10, 11, and 12, respectively, and are decoded by a decoder 20. The start address PA3 read out of the table 10 designates a program P3. The start address PAO read out of the tables 11 and 12 designate a program PO, respectively.

Now, when two color codes A ($R_1G_1B_1$) and B ($R_2G_2B_2$) are used, there are four combinations of $R_1$ with $R_2$ in each red bit portion, that is, [00], [01], [10], and [11]. With respect to the green bit portion ($G_1$ and $G_2$) and the blue bit portion ($B_1$ and $B_2$), there are also four combinations, the same as those of the red bit portions.

When the combination of bit portions is [00], the color data is "0". When the combination is [11], the color data is "1". When the combination is [10], the color data is pattern data input from the display pattern generator 1, and when the combination is [01], the color data is an inversion of the pattern data. Therefore, four programs PO to write "0", P1 to write "1", P2 to write the pattern data, and P3 to write the inverted pattern data into a video memory are stored in the program memory 14.

The combination of bit portions for a two-color display and the programs to be selected are shown in Table 2 below.

TABLE 2

| Code | FG | BG | Start Address | Program |
|---|---|---|---|---|
| R | 0 | 0 | PA0 | P0 |
| | 0 | 1 | PA3 | P3 |
| | 1 | 0 | PA2 | P2 |
| | 1 | 1 | PA1 | P1 |

TABLE 2-continued

| Code | FG | BG | Start Address | Program |
|---|---|---|---|---|
| G | 0 | 0 | PA0 | P0 |
| | 0 | 1 | PA3 | P3 |
| | 1 | 0 | PA2 | P2 |
| | 1 | 1 | PA1 | P1 |
| B | 0 | 0 | PA0 | P0 |
| | 0 | 1 | PA3 | P3 |
| | 1 | 0 | PA2 | P2 |
| | 1 | 1 | PA1 | P1 |

Where:

P0: write "0" into a video memory

P1: write "1" into a video memory

P2: write "pattern data" into a video memory

P3: write "inverted pattern data" into a video memory

In the case where the foreground is black "0 0 0" and the background is red "1 0 0", three programs are selected, as shown in Table 3 below.

TABLE 3

| | FG Black | BG Red | Start Address | Program |
|---|---|---|---|---|
| R | 0 | 1 | PA3 | P3 |
| G | 0 | 0 | PA0 | P0 |
| B | 0 | 0 | PA0 | P0 |

A writing operation according to this embodiment now will be described with reference to FIG. 5 for the operation steps, and to FIGS. 3 and 4 for structural elements. In response to a processing start command, the control circuit 9 resets a counter register (N) to zero and enters pattern data "0 1 0" displayed at address locations XX, XX'1, and XX'2 on a screen. The black code "0 0 0" for the pattern data "1" and red code "1 0 0" for the pattern data "0" are applied to the control circuit 9 and are set in the register 17. At this point, the content of the register 17 is "0 0 0 0 0", or "4". Thus, the start address PA3 is read out of the table 10, so that the program P3 is selected and applied to the program execution circuit 15. The program execution circuit 15 produces the inverted pattern data "1 0 1" according to the program P3. As a result, the color data "1 0 1" is written into the address locations XX, XX'1, and XX'2 of the video memory 4 (R) at the same time.

When the writing operation of the color data "1 0 1" is terminated, the counter register (N) is incremented by +1. At this time, since the content of the counter register (N) is not "2", the program PO is selected by the start address PAO of the table 11 to which the address "0 0 0 1 0 0" is applied. The program execution circuit 15 produces color data "0 0 0" in accordance with execution of the program PO. The produced color data "0 0 0" is written into the address locations XX, XX+1 and XX+2 of the video memory 5 (G) at the same time.

Thereafter, the counter register (N) is further incremented by +1. Then, the program PO is executed again in accordance with the start address PAO of the table 12. Thus, the color data "0 0 0" is written into the address locations XX, XX+1, and XX+2 of the video memory 6 (B) at the same time. At this point, since the content of the register (N) is "2", the writing operation of the color pattern corresponding to the address locations XX, XX'1, and XX'2 of the video memories 4, 5, and 6 is terminated. As a result of the writing operation, red-black-red is sequentially displayed on the screen, as shown in FIG. 6.

According to this embodiment, color data can be written into the respective video memories in at most three writing operations. Of course, these writing operations can be performed in parallel, rather than in series. Further, no operation to change the content of the video memories is required. Thus, the color data processing can be performed quickly. Moreover, since the tables 10, 11, and 12 are accessed by the combination of color codes, program selection is very easy. For example, when the foreground (FG) is red (color code "1 0 0") and the background (BG) is green (color code "0 1 0"), the content of the register 17 is "1 0 0 0 1 0", or "34". As a result, the start addresses PA2, PA3, and PAO are designated, respectively, and the programs P2, P3, and PO are selected, as shown in FIG. 4. Thus, arbitrary color data can be produced easily, at high speed.

If the color code generator generates more than two colors for multicolor display (three, for example), then three color codes are combined and are used as an address for designating start addresses. Eight ($2^3$) start addresses PAO to PA7 and eight programs PO to P7 are used because there are 8 combinations of each color bit portions, that is, [000], [001], [010], . . . , [111]. To select one of eight programs, a table having 512 ($2^9$) address locations is required. However, the color data can be written into the respective video memory in one writing operation.

Further, when filing or masking is required, a control code designating filing or masking is combined with a color code or codes, and is used as an address for accessing tables. In this case, the color data can be produced at high speed through digital pattern processing and color processing.

What is claimed is:

1. A display pattern processing apparatus comprising:

means for generating a display pattern;

means for generating a plurality of color codes, including red component codes, green component codes, and blue component codes, for displaying the display pattern in a plurality of colors;

a program memory for storing a first program for producing a first constant value irrespective of the display pattern, a second program for producing a second constant value irrespective of the display pattern, said second constant value being different from said first constant value, and a third program for producing a third value relative to the display pattern;

means, responsive to said red component codes and to said display pattern generating means, for selecting one of said first to third programs and for executing the selected program to produce red color component data accordingly;

means, responsive to said green component codes and to said display pattern generating means, for selecting one of said first to third programs and for executing the selected program to produce green color component data accordingly;

means, responsive to said blue component codes and to said display pattern generating means, for selecting one of said first to third programs and for executing the selected program to produce blue color component data accordingly;

a plurality of video memories for receiving said red, green, and blue color component data; and means for writing said red, green, and blue color component data into said video memories.

2. A display pattern processing apparatus as claimed in claim 1, wherein said first constant value consists of a plurality of bits, each of which is "0", said second constant value consisting of a plurality of bits, each of which is "1", and said third value being equal to said display pattern or to an inverted one of said display pattern.

3. A display pattern processing apparatus comprising:

means for generating a display pattern;

means for generating a plurality of color codes;

means for producing an address corresponding to said plurality of color codes;

a first table memory for storing a first group of table addresses;

a second table memory for storing a second group of table addresses;

a third table memory for storing a third group of table addresses;

a program memory for storing a first program for producing a first constant value irrespective of said display pattern, a second program for producing a second constant value irrespective of said display pattern, said first constant value being different from said second constant value, a third program for producing first data equal to said display pattern, and a fourth program for producing second data equal to an inverted one of said display pattern;

means, responsive to the table address read out of said first table memory and to said display pattern generating means, for selecting one of said first to fourth programs and for executing the selected program to produce first color data accordingly;

means, responsive to the table address read out of said second table memory and to said display pattern generating means, for selecting one of said first to fourth programs and executing the selected program to produce second color data accordingly;

means, responsive to the table address read out of said third table memory and to said display pattern generating means, for selecting one of said first to fourth programs and executing the selected program to produce third color data accordingly;

a first vide memory for receiving said first color data;

a second video memory for receiving said second color data;

a third video memory for receiving said third color data; and means for writing said first color data, said second color data, and said third color data into said first video memory, said second memory, and said third video memory, respectively.

4. A display pattern processing apparatus as claimed in claim 3, wherein said first color data is red data, said second color data is green data, and said third color data is blue data.

5. A display pattern processing apparatus as claimed in claim 3, wherein said first constant value consists of a plurality of bits, all of which are "0", and said second constant value consists of a plurality of bits, all of which are "1".

6. A display pattern processing apparatus comprising:

a video memory for storing data;

a display pattern generator for generating first pattern data;

a program memory for storing a first program, for writing a data "0" into the video memory, a second program, for writing a data "1" into the video memory, a third program, for writing said first pattern data generated by the display pattern generator into the video memory, and a fourth program, for writing second pattern data, which is inverted with respect to said first pattern data, into the video memory;

means for generating a plurality of color codes;

means, responsive to said plurality of color codes, for producing combined color codes;

means, responsive to the combined color codes, for selecting one of said first, second, third, and fourth programs;

means, responsive to the selected program, for producing color data; and means for writing the color data into the video memory,

* * * * *

UNITED STATES PATENT AND TRADEMARK OFFICE
CERTIFICATE OF CORRECTION

PATENT NO. : 4,908,779

DATED : March 13, 1990

INVENTOR(S) : Tsukasa Iwata

It is certified that error appears in the above-identified patent and that said Letters Patent is hereby corrected as shown below:

Column 3, line 34, delete "XX+1'" and insert --XX+1,--.

Column 3, line 40, delete "XX'1" and insert --XX+1--.

Column 5, line 35, delete "XX'1, and XX'2" and insert --XX+1, and XX+2--.

Column 5, line 39, delete " "00000" " and insert --000100--.

Column 5, line 45, delete "XX'1, and XX'2" and insert --XX+1, and XX+2--.

Column 5, line 65, delete "XX'1, and XX'2" and insert --XX+1, and XX+2--.

Column 8, line 3, delete "vide" and insert --video--.

Signed and Sealed this

Sixteenth Day of July, 1991

*Attest:*

HARRY F. MANBECK, JR.

*Attesting Officer*

*Commissioner of Patents and Trademarks*